United States Patent [19]

Jones

[11] Patent Number: 5,565,770
[45] Date of Patent: Oct. 15, 1996

[54] LINEAR POSITION SENSOR INCLUDING A FIRST OPEN HOUSING HAVING A RECIPROCAL, BIASED MAGNET HOLDER AND MAGNET AND REMOVABLE SECOND HOUSING HAVING A HALL SENSOR

[75] Inventor: Kim F. Jones, Mantua, Ohio

[73] Assignee: Lubriquip, Inc., Warrensville Heights, Ohio

[21] Appl. No.: 275,345

[22] Filed: Jul. 15, 1994

[51] Int. Cl.$^6$ ............................ G01B 7/14; G01R 33/02
[52] U.S. Cl. ................................. 324/207.24; 324/262
[58] Field of Search .......................... 324/207.15, 207.2, 324/207.21, 207.22, 207.24, 207.23, 207.26, 174, 207.25, 262

[56] References Cited

U.S. PATENT DOCUMENTS

| | | |
|---|---|---|
| 3,220,375 | 11/1965 | Gruber et al. . |
| 3,921,760 | 11/1975 | Brownrigg . |
| 4,107,604 | 8/1978 | Bernier ................... 324/207.2 |
| 4,312,425 | 1/1982 | Snow et al. . |
| 4,359,895 | 11/1982 | Wolff et al. ............ 324/207.2 |
| 4,401,946 | 8/1983 | Klimstra ................. 324/207.24 |
| 4,419,646 | 12/1983 | Hermle ................... 324/207.26 |
| 4,445,168 | 4/1984 | Petryszyn . |
| 4,507,976 | 4/1985 | Banko . |
| 4,520,902 | 6/1985 | Snow . |
| 4,572,331 | 2/1986 | Powell et al. . |
| 4,922,197 | 5/1990 | Juds et al. ............. 324/207.26 |
| 4,966,041 | 10/1990 | Miyazaki ................ 324/207.2 |
| 5,002,090 | 3/1991 | Ichikawa et al. ........ 324/207.2 |
| 5,115,186 | 5/1992 | Reinartz et al. ........ 324/207.2 |

FOREIGN PATENT DOCUMENTS 2932658   8/1979   Germany ............ 324/207.24

Primary Examiner—Sandra L. O'Shea
Assistant Examiner—Roger C. Phillips
Attorney, Agent, or Firm—Hill, Steadman & Simpson

[57] ABSTRACT

A magnet sensor or "proximity switch" for sensing reciprocation of for example a spool within a lubrication distributor block. The sensor provides a threaded nozzle for screwing into the block with a bore therethrough. A magnet holder extends out of the nozzle and mounts a magnet thereto recessed inside the housing. The magnet holder is moveable reciprocally by the reciprocating spool. A sensor body is connected to the housing and holds a magnetic sensing element such as a Hall effect sensor adjacent to the housing for sensing the proximity of the magnetic field of the reciprocating magnet.

16 Claims, 1 Drawing Sheet

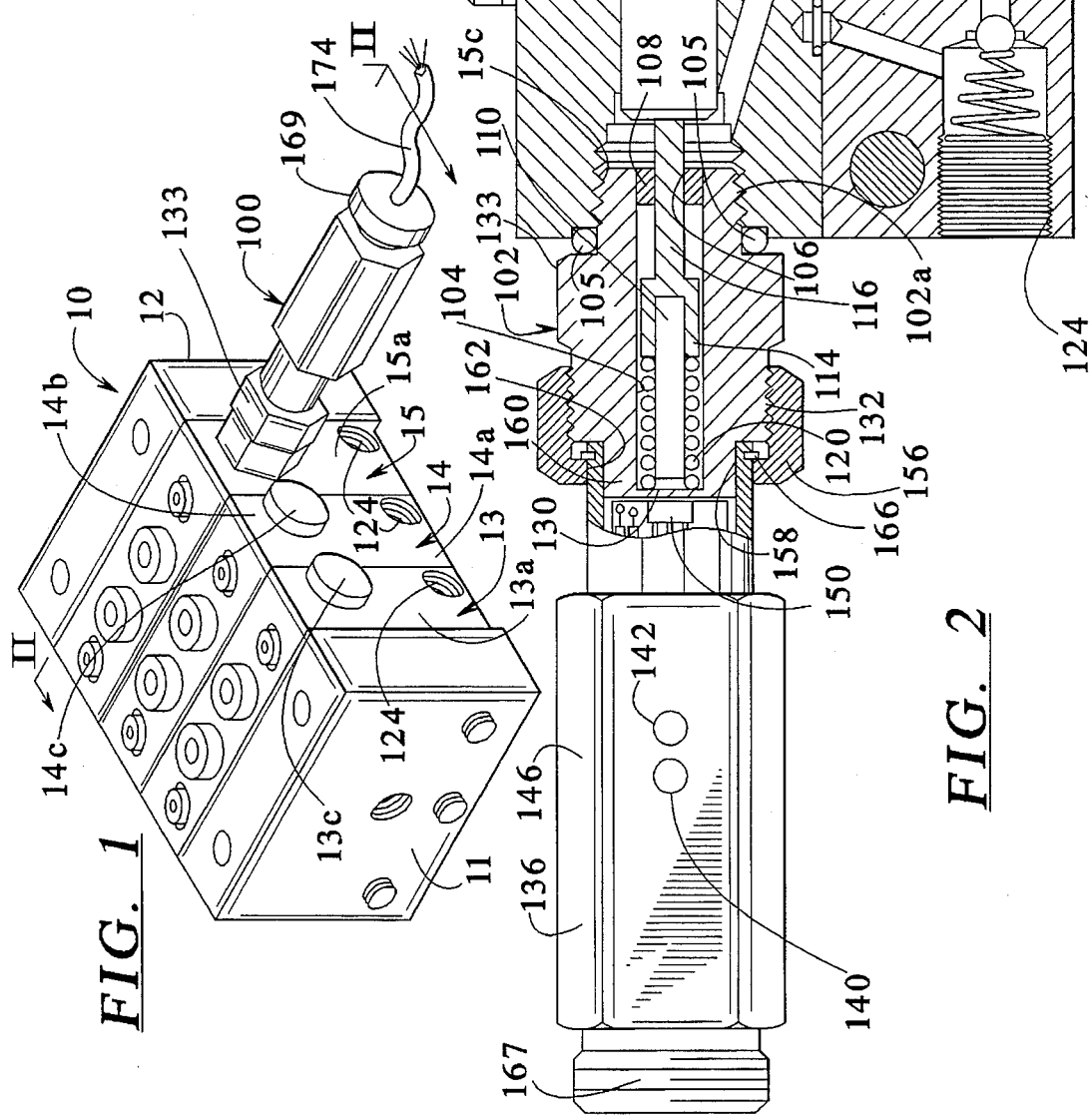

LINEAR POSITION SENSOR INCLUDING A FIRST OPEN HOUSING HAVING A RECIPROCAL, BIASED MAGNET HOLDER AND MAGNET AND REMOVABLE SECOND HOUSING HAVING A HALL SENSOR

BACKGROUND OF THE INVENTION

The present invention relates to magnetic sensors, and in particular to sensors for cyclic lubricant feeders utilizing reciprocating distributor valves, the sensor being a magnetic sensor for sensing the movement of a reciprocating valve.

A cyclic lubricant distributor valve is disclosed, for example, in U.S. Pat. No. 4,312,425 and U.S. Pat. No. 3,921,760. These distributor valves utilize a block or blocks having a spool bore for holding and guiding a reciprocating spool therein. The spool has cylindrical formations along its length to form various flow paths between formations. A plurality of oil passages are connected into the spool bore along its length. The spool bore and ports form a plurality of oil channels which are activated and deactivated according to the movement of the spool within the spool bore. The distributor valve thus distributes oil in pulses to a plurality of users such as bearings in a machine.

It is desirable for monitoring and/or control to sense the movement of a spool within the spool bore. It is known, such as from U.S. Pat. No. 4,572,331, to provide a rod projecting outward of a distributor block and connected to a reciprocating spool, the rod contacting a micro switch to open and close according to the spool position. However, such a construction requires a packing or seal at the block to seal the reciprocating rod.

SUMMARY OF THE INVENTION

It is an object of the present invention to provide a sensor which is able to detect the presence, or proximity of a spool in a lubricant distribution block. It is an object that the sensor be readily fittable into existing distribution valve blocks. It is an object of the invention that the sensor is self contained in that no packing or seal is required at the block to seal a reciprocating rod.

It is an object of the present invention that the sensor is insensitive to external magnetic influences, both environmental and electrical. It is an object of the invention to provide a sensor which is more insensitive to damage before and after installation.

It is an object of the invention to provide a sensor housing sealed to the block and forming a closed compartment for a magnet, and to provide a sensor body for holding electronics including a sensing element, the sensor body flow isolated from the sensor housing to prevent the possibility of lubricating oil from the block entering the sensor body. It is an object that the sensor housing and sensor body are separate, modular pieces which can be readily assembled together both before and after installation of the sensor to the block.

The objects of the invention are achieved in that a magnet is provided inside a sensor housing, the magnet reciprocatable within the sensor housing. The sensor housing is effectively sealed to the block by threaded engagement thereto compressing a gasket or O-ring seal. The housing is open to the block, particularly to the spool inside the block. The spool moves the magnet reciprocally which activates a sensor element responsive to the magnetic field of the magnet. A magnet holder is used to hold the magnet within the sensor housing, the holder between the magnet and the distributor block. The holder keeps the magnet steady and protected within the sensor housing. The holder is constructed preferably of stainless steel which will not conduct magnetic fields into the sensor housing. The holder and the sensor housing are adapted such that the holder has two locations of contact or support along its length for stability and guidance as it slides inwardly/outwardly within the housing with the movement of the spool, reducing lateral vibration. The holder material can be selected to be compatible with repetitive impact by the spool, without the necessity of being magnetically charged.

A sensor body is provided for holding a sensing element, such as a Hall effect sensor, and associated electronics, and the sensor body is connected to the sensor housing. The sensor housing provides an enclosed container for the magnet, open only to the block and sealed thereto. A back wall separates an inside of the sensor housing with an inside of the sensor body to block any possible leakage of lubricant from the sensor housing into the sensor body connected thereto. The sensor housing can thus be fashioned to be a high pressure containing vessel reducing the possibility of leakage. The sensor body is readily assembled or disassembled from the sensor housing by a retaining nut and lock ring assembly.

The sensor housing design allows for easy adjustment of indication LEDS located on the sensor body, by loosening the retaining nut, rotating the body, and then re-tightening. This is particularly advantageous when the sensor must be used in confined areas where precise rotary orientation of the LEDS is important.

The sensor provides several additional advantages. The sensor housing is now more durable, easier to assemble, disassemble, install and adjust. The modular separation of sensor housing and sensor body reduces cost of replacing entire assemblies if, for example, only the sensing element is faulty. The sensor body can be replaced "on-line" by separation from the sensor housing. The magnet and holder provide a more stable stroke and increased immunity to vibrational interference. The assembly is resistant to false signals from vibration and impact tests. Susceptibility to external magnetic interference is also greatly reduced.

BRIEF DESCRIPTION OF THE DRAWINGS

FIG. 1 is a perspective view of an oil distributor block using a sensor of the present invention;

FIG. 2 is a cross-sectional view taken generally along line II—II of FIG. 1; and FIG. 3 is a left side view of the sensor of FIG. 2.

DETAILED DESCRIPTION OF THE PREFERRED EMBODIMENTS

Although the sensor of the present invention is advantageous when utilized in a cyclic lubricant distributor, the invention is not limited to such an environment. The invention can be used to sense moving parts in a number of environments, and such are encompassed by the present invention.

FIG. 1 illustrates a cyclic lubricant distributor valve 10 having an inlet block unit 11, an end block unit 12 and a plurality of intermediate block units 13, 14 and 15. Typically the intermediate block units 13, 14 and 15, are identical and each comprise a base member and a separate spool holding member mounted thereto. The base members 13a, 14a, 15a and the spool holding members 13b, 14b, 15b are described in U.S. Pat. No. 4,312,425 which patent is herein incorporated by reference. Within each spool holding member resides a spool which reciprocates in a direction A as shown in FIG. 2.

The intermediate blocks 13 and 14 are shown having end closure plugs 13c, 14c respectively, screwed into threaded openings (not shown). The third intermediate block 15 has a threaded port 15c (shown in FIG. 2) which receives a sensor 100 of the present invention.

FIG. 2 illustrates this sensor 100 of the present invention in more detail. The sensor 100 provides a sensor housing 102 having a threaded nozzle 102a which screws into the port 15c of the block 15 opposite a spool 103 residing within a spool bore 103a of the block 15. The housing 102 provides a longitudinal magnet bore 104 which has an open end 106 at a front end of the nozzle 102a. The housing 102 is sealed to the block 15 by, for example, an O-ring seal 105. Alternately, a flat gasket or other sealing means can be used if necessary. A sleeve insert 108 is fixed at the open end 106 within the bore 104. A cylindrical magnet 110 is located within the magnet bore and held by a magnet holder 112 which has a magnet coupling socket 114 for holding the magnet. The holder has a reduced diameter rod 116 journaled within the sleeve 108 and extendable, at least partially, into the bore 103a of the spool holding member 15b. The rod 116 can make direct contact with the spool 103 or be driven by oil pressure. The spool 103 is slideably held within the bore 103a and as described in U.S. Pat. No. 4,312,425 reciprocates back-and-forth in the direction A to distribute lubricating oil to at least lubricant outlets 124 which are flow connected to various lubricant users, such as bearings throughout a machine (not shown).

The magnet holder 112 is urged by a spring 120 toward the spool 103. As the spool reciprocates, it moves the rod 116 accordingly to the left of FIG. 2 and the rod returns to the right by spring force. The spring 120 is supported against an end wall 130 of the housing, which closes the magnet bore 104. The housing 102 has outside threads 132 at an opposite end to the threaded nozzle 102a, opposite the block 15, and a hexagon formation 133 between the outside threads 132 and the threaded nozzle 102a. The hexagon formation 133 is for wrench engagement for installation and adjustment of the sensor 100.

A sensor body 136 is provided connected to the housing 102 having aperture 140, 142 for location of red and green LED indicators. The sensor body 136 has a hexagonal cross-section 146 for adjustments and handling. The sensor body 136 is hollow for containing electronics. Mounted within the sensor body 136 is a magnet sensing element 150 which can be a Hall effect sensor, an induction sensor or other magnetic sensor. The sensing element reacts to the approaching or receding magnetic field of the magnet to register a proximity of the magnet and thus to register a "count" or a "reciprocation" of the spool 103. The sensing element 150 is directly opposite the wall 130.

To adjust the rotational position of this sensor body 136 with respect to the housing 102 an adjustment nut 156 is provided. The sensor body 136 has an open end 158 which captures a reduced diameter end 160 of the barrel 102. The adjustment nut has a through hole 162 which receives the sensor body 136. The sensor body has a lock ring 166 keyed there to for retaining the sensor body 136 onto the adjustment nut.

The adjustment nut 156, by screwing onto the threads 132, holds the sensor body 136 tightly to the housing 102. To adjust the axial rotary position of the sensor body, for convenient viewing of the LED indicators, the adjustment nut is loosened, the sensor body 136 is selectively turned, and then the adjustment nut is re-tightened.

At a distal end of the sensor body 136 is a threaded connector portion 167 for receiving a cable connector 169 as shown in FIG. 1.

FIG. 3 shows electronic terminal pins 170 exposed and recessed in the connector portion 167 of the sensor body 136 to electrically engage the cable connector 169, to wire the sensor 100 to a controller or monitor (not shown). A tab 171 prevents misconnection of the cable connector 169 to the sensor. A cable 174 is shown in FIG. 1 being connected to the sensor 100 by the connector 169.

Although the present invention has been described with reference to a specific embodiment, those who are skilled in the art will recognize that changes may be made thereto without departing from the scope and spirit of the invention as set forth in the appended claims.

The invention claimed is:

1. A sensor for sensing the position of a moving part within a block, comprising:

a sensor housing engagable to the block, having an open end into said block and an otherwise closed configuration;

an elongate rigid magnet holder mounted slideably and partially within said housing having a free end protruding outwardly of said housing and abutted by said part;

a magnet held fixedly at least partially within said magnet holder;

a means for biasing the magnet holder toward the part, said magnet holder moveable in a first direction by pushing force from said part and moveable in a second, opposite direction by said means for biasing; and a magnetic field sensing element responsive to position of a magnetic field created by said magnet, said sensing element mounted to an outside of said sensor housing.

2. The sensor according to claim 1, wherein said sensing element is a Hall effect sensing element.

3. The sensor according to claim 1, wherein said housing comprises a threaded nozzle adapted to be screwed into said block, said nozzle having an open end and a magnet bore therethrough extending to said open end for guiding sliding movement of said magnet.

4. The sensor according to claim 3, wherein said magnet holder has a socket at a first end and a rod extending therefrom to said free end, said socket holding said magnet partially therein.

5. The sensor according to claim 4, wherein said rod has a reduced diameter compared with said socket, and said socket is sized to be guided closely by said bore, and said housing comprises a sleeve insert fixed within said magnet bore at said open end for guiding said rod.

6. The sensor according to claim 3, further comprising a sensor body selectively rotatably connected to said sensor housing, and an adjustment nut surrounding said sensor body and engagable to external threads on said housing to fix the rotary orientation of said sensor body to said housing.

7. The sensor according to claim 1, wherein said sensing element is an inductive sensor.

8. A magnetic proximity switch for a reciprocating lubrication distributor block having reciprocating spools therein, comprising:

a housing having a threaded nozzle for screwing into the block aligned with one of the spools, said threaded nozzle having a longitudinal bore with an open first end and a closed second end;

a magnet holder held reciprocally within said bore and extendable out of said first end into said block to be abuttable by said spool, said magnet holder reciprocally driven by a pushing force from said spool;

a magnet held by said holder within said bore; a spring arranged within said housing and urging said magnet holder away from said closed second end, said spring surrounding said magnet;

a sensor body connected to said housing at said second end;

a magnetic sensing element mounted within said sensor body outside said housing and responsive to position of a magnetic field created by said magnet through said closed second end.

9. The sensor according to claim 8, wherein said sensor comprises a Hall effect element.

10. The sensor according to claim 8, wherein said sensor body is adjustable in axially rotary position with respect to said housing.

11. The sensor according to claim 8, wherein said sensing element is an inductive sensor.

12. A modular sensor for sensing the position of a moving part within a block comprising:

a sensor housing having a closed configuration except for an open end, the sensor housing mountable to the block with said open end open into an inside of said block through an opening of said block, said sensor housing sealable to said block around said opening, said sensor housing having an end wall along an axis of said housing, opposite said open end;

a magnet holder held slideably within said housing and protruding out of said open end to abut said moving part;

a magnet held at least partially within said magnet holder, said magnet holder receiving a force from said moving part to translate said magnet reciprocally in at least one direction along said axis;

a sensor body engagable to an outside of said sensor housing;

a magnetic sensing element mounted within said sensor body, adjacent said end wall of said sensor housing, said element responsive to a magnetic field position of said magnet through said end wall.

13. The modular sensor according to claim 12 wherein said sensor housing has external threads around said open end for screw engagement into said opening of the block.

14. The modular sensor according to claim 13 wherein said sensor body comprises an elongate hollow form having an encircling retaining nut, said element held within said form; and said sensor housing comprises further external threads on a side thereof toward said sensor body, said retaining nut arranged to engage said further external threads to clamp said sensor body to said sensor housing.

15. The modular sensor according to claim 14 wherein said sensor body comprises plug connector means for connecting a cable at an end opposite said retaining nut.

16. The modular sensor according to claim 12 wherein said sensor housing comprises a longitudinal bore extending to said open end and having an opposite closed end, and said holder comprises a socket member coupled to said magnet and an elongate rod member extending from said socket member, said holder guided within said bore and said rod extendable to said moving part.

* * * * *